United States Patent [19]

Richman

[11] 4,178,582

[45] Dec. 11, 1979

[54] DIGITAL SIGNAL TRANSMITTER/RECEIVER SYSTEM INCLUDING PROGRAMMABLE SELF-TEST CAPABILITY

[75] Inventor: Jay L. Richman, Montville, N.J.

[73] Assignee: The Bendix Corporation, Teterboro, N.J.

[21] Appl. No.: 919,105

[22] Filed: Jun. 26, 1978

[51] Int. Cl.² ............................................. G08C 25/00
[52] U.S. Cl. ....................... 340/146.1 E; 179/175.3 R
[58] Field of Search ................................ 340/146.1 E; 179/175.3 R, 175.31 R; 325/41

[56] References Cited

U.S. PATENT DOCUMENTS

| | | | |
|---|---|---|---|
| 3,787,810 | 1/1974 | Wiggins et al. | 340/146.1 E |
| 4,022,988 | 5/1977 | Lentz et al. | 340/146.1 E |
| 4,112,414 | 9/1978 | Iscol et al. | 179/175.3 R |

Primary Examiner—Charles E. Atkinson
Attorney, Agent, or Firm—William F. Thornton; Anthony F. Cuoco

[57] ABSTRACT

In a system of the type including means for transmitting differential digital input signals and means for receiving the transmitted signals, apparatus associated with the system for programming the inputs to and thereby controlling the operational outputs from the receiving means, whereby a self-test capability is imparted to the system.

14 Claims, 2 Drawing Figures

DIGITAL SIGNAL TRANSMITTER/RECEIVER SYSTEM INCLUDING PROGRAMMABLE SELF-TEST CAPABILITY

FIELD OF THE INVENTION

This invention relates generally to systems for transmitting and receiving differential digital input signals and, particularly, to systems of the type described including a programmable self-test implementation.

DESCRIPION OF THE PRIOR ART

Systems for transmitting and receiving differential digital input signals such as may be used, for purposes of illustration, in aircraft control equipment may include a computer for providing a digital signal, a remote differential driver for transmitting corresponding differential signals over appropriate transmission lines and a differential receiver for providing an output signal which is applied to utilizing means such as, for purposes of illustration, a display device or the like. In many applications, systems of the type described would offer superior performance with the inclusion of a self-test capability particularly as described by the present invention.

SUMMARY OF THE INVENTION

This invention contemplates a digital signal transmitter/receiver system including a differenial line driver which is controlled for being in an ON or OFF state. The driver is responsive to an input signal for transmitting a pair of differential signals, one of which switches between logic HIGH and logic LOW states, and the other of which switches between logic LOW and logic HIGH states during normal operation of the system, i.e., the driver in the ON state. When the driver is in the OFF state the differential signal transmission lines are in a HIGH IMPEDANCE state and inhibit signal transmission. This will be recognized as a common application of tri-state line drivers.

The signals are transmitted to a differential receiver for providing an output signal which is applied to utilizing means such as display apparatus or the like. Differential comparator means having positive and negative input terminals are connected intermediate the driver and the receiver, and arranged with a negative input referenced to a threshold voltage so that whenever the positive input exceeds the negative input the comparative means output turns OFF. Therefore, applying programmed signals at appropriate logic levels to the positive inputs of the comparator means, imparts a self-test capability to the system in that the receiver outputs are at predetermined logic levels if the receiver is operational in the OFF state of the driver.

DESCRIPTION OF THE INVENTION

Figure 1:
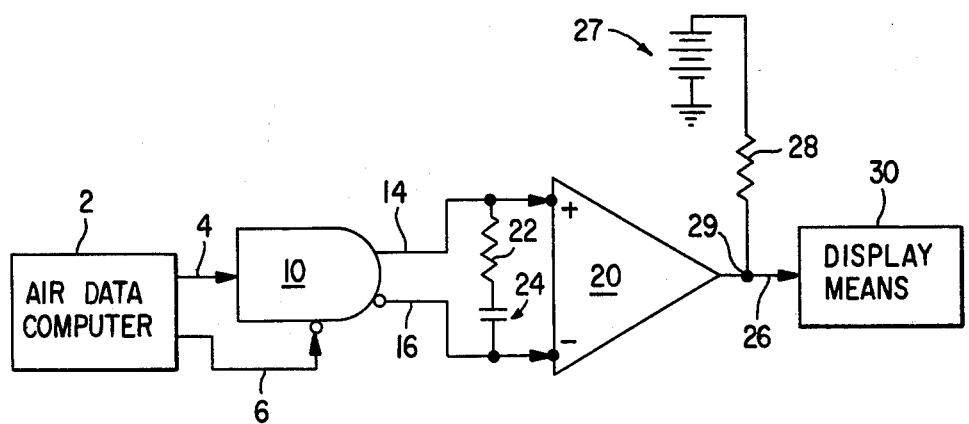
FIG. 1 is a combination block diagram-electrical schematic illustrating a prior art differential digital signal transmitter/receiver system.

With reference first to FIG. 1, a typical prior art differential digital signal transmitter/receiver system is shown and will be described for purposes of better illustrating the novel features of the present invention.

A signal source designated by the numeral 2, which is shown for purposes of illustration as an air data computer such as used for aircraft navigational purposes, provides a digital data signal at an output conductor 4 and a digital control signal at an output conductor 6. The data signal at conductor 4 is applied to an input terminal 8 of a differential line driver 10 while the control signal at conductor 6 is applied to an input terminal 12 of line driver 10 and inverted thereat. In this connection, differential line driver 10 is of a commercially available type such as manufactured by the Fairchild Corporation under their trade designation 9634.

Line driver 10 provides differential signals at transmission lines 14 and 16. Transmission line 14 is connected to a positive input terminal (+) of a differential receiver designated by the numeral 20 and transmission line 16 is connected to a negative input terminal (−) of differential receiver 20. A resistor 22 is serially connected to a capacitor 24 and the resistor and capacitor are connected across the positive (+) and negative (−) input terminals of differential receiver 20. In this connection, differential receiver 20 may be one-quarter of a commercially available integrated circuit comparator such as manufactured by National Semiconductor Corporation under their trade designation LM139.

A suitable +5 volt d.c. supply voltages source such as a battery 27 is connected through a resistor 28 to an output conductor 26 of differential receiver 20 at a circuit point 29. Output conductor 26 is connected to a signal processing or utilizing means designated by the numeral 30, which may be a display means for displaying the transmitted data from air data computer 2 as is well known in the art.

The control signal from air data computer 2 at output conductor 6 applied to line driver 10 is effective for rendering the line driver in an ON or OFF state as commanded by the computer. Resistor 22 and capacitor 24 form a line impedance matching network. During normal operation, i.e., when line driver 10 is in the ON state, the signal at transmission line 14 (input signal HIGH) switches between logic ONE and logic ZERO states, while the signal at transmission line 16 (input signal LOW) switches between logic ZERO and logic ONE states. When the control signal from air data computer 2 renders line driver 10 in the OFF state, i.e., during periods of inactivity between signal transmission, transmission lines 14 and 16 are in a HIGH IMPEDANCE or OFF state and inhibit signal transmission.

The aforenoted will be recognized as a common tri-state line driver arrangement. With the line driver rendered in an ON state, the first state occurs when one of the differential signals switches between logic HIGH and logic LOW and the second state occurs when the other of the differential signals switches between logic LOW and logic HIGH. The third state occurs when line driver 10 is rendered in an OFF state and differential signal transmission lines 14 and 16 assume a HIGH IMPEDANCE state as aforenoted.

A particular situation is encountered with the system shown and described with reference to FIG. 1, in that it is desirable in many applications, particularly aircraft applications, that a self-test arrangement be included in the system. An arrangement for this purpose according to the invention is illustrated in FIG. 2.

Figure 2:
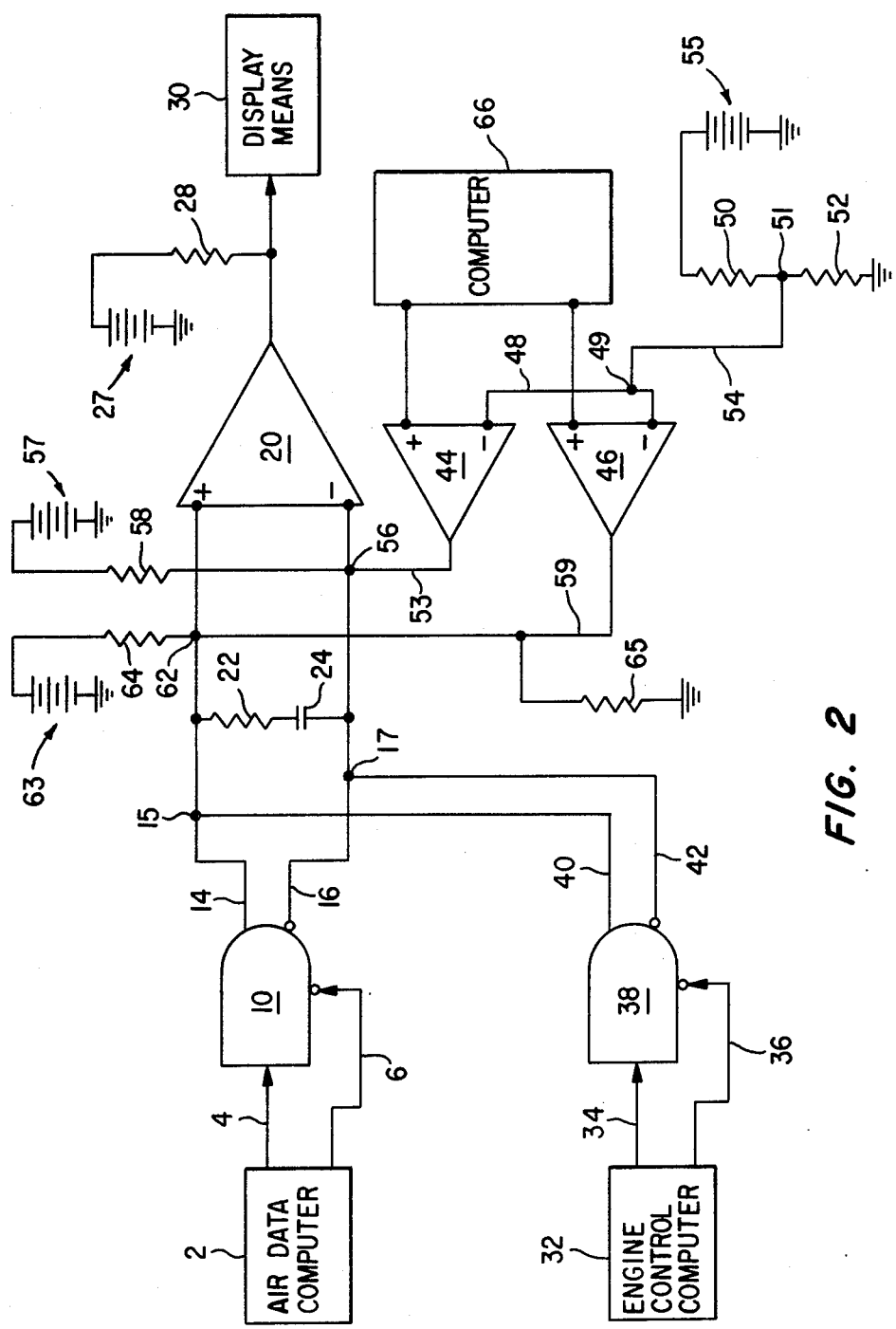
FIG. 2 is a combination block diagram-electrical schematic illustrating a differential digital signal transmitter/receiver system having a self-test capability in accordance with the invention.

With reference to FIG. 2, it will first be understood that differential receiver 20 may accommodate a plurality of channels, two of which are illustrated for purposes of illustration. One of the channels includes air data computer 2 providing data and control signals at conductors 4 and 6, respectively, line driver 10 having transmission lines 14 and 16 connected to differential receiver 20 and the resistance-capacitance impedance matching network including resistor 22 and capacitor 24 as shown and described with reference to FIG. 1, and whereby the output signal from differential receiver 20 combined with the +5 volt d.c. signal from battery 27 is applied to display means 30.

Another channel is shown as including, for purposes of illustration, an aircraft engine control computer 32 providing a digital data signal at an output conductor 34 and a digital control signal at an output conductor 36. Conductors 34 and 36 are connected to a line driver 38 similar in all respects to line driver 10. Differential signals are provided at transmission lines 40 and 42 of line driver 38. Line 40 is connected to line 14 at a circluit point 15 and line 42 is connected to line 16 at a circuit point 17. It will be understood that either line driver 10 or 38 will be controlled by the appropriate control signal applied over conductors 6 or 36, respectively, so that either the differential signals from line driver 10 or the differential signals from line driver 38 are applied to differential receiver 20, as the case may be, and as described with reference to FIG. 1.

With further reference to FIG. 2, the self-test feature of the invention is implemented by a differential comparator arrangement including a pair of comparators 44 and 46. Comparators 44 and 46 may each be one-quarter of the aforenoted National Semiconductor comparator LM139. The comparators each have positive (+) and negative (−) input terminals. The negative input terminals of the comparators are connected through a conductor 48 and are referenced to a threshold voltage determined by the ratio of resistors 50 and 52. A conductor 54 is connected to conductor 48 at a circuit point 49 and is connected intermediate the resistors at a circuit point 51. Resistor 50 is connected to a suitable +5 volt d.c. voltage source such as a battery 55 while resistor 52 is connected to ground. The ratio of the resistors connected to battery 55 is such that typically the threshold voltage is in the magnitude of 1.5 volts.

An output conductor 53 of comparator 44 is connected to differential signal transmission line 16 at a circuit point 56. A +5 volt d.c. biasing voltage source such as a battery 57 is connected through a resistor 58 to circuit point 56. An output conductor 59 of comparator 46 is connected to differential signal transmission line 14 at a circuit point 62. A +5 volt d.c. biasing voltage source such as a battery 63 is connected through a resistor 64 to circuit point 62 and conductor 59 is grounded through a resistor 65. Biasing voltage sources 27, 55, 57 and 63 may be one and the same as will be understood by those skilled in the art.

The positive (+) input terminals of comparators 44 and 46 are connected to a general purpose computer 66 which may be, for purposes of illustration, of the type manufactured by The Bendix Corporation under the trade designation BDX 910. To implement the self-test feature of the invention, computer 66 applies logic HIGH or LOW signals to the positive (+) input terminals of comparators 44 and 46. It is noted that the output stage of comparators 44 and 46 are essentially "open collector" transistors so that whenever the inputs to the positive input terminals exceed the inputs to the negative input terminals the comparator outputs turn off.

Therefore, programming a logic ONE at the positive input terminals of the comparators relinquishes control of the signals transmitted over transmission lines 14 and 16 during normal operation, i.e., when the differential drivers are ON.

Programming a logic ONE (HIGH) at the positive (+) input terminal of comparator 44 and a logic ZERO (LOW) at the positive (+) input terminal of comparator 46 during the interval when the differential drivers are in the OFF (HIGH IMPEDANCE state of conductors 14 and 16) or TEST state forces a logic ZERO state at the inputs to receiver 20. The receiver output should be at ZERO state if it is operational. Similarly, programming a logic ZERO at the positive (+) input terminal of comparator 44 and a logic ONE at the positive (+) input terminal of comparator 46 when the differential drivers are rendered in the OFF or TEST state forces a logic ONE state at the differential receiver inputs. The receiver output should therefore be at a logic ONE state if operational. The aforenoted logic states are shown in the truth table as follows:

|  | NORMAL | TEST |
| --- | --- | --- |
| COMPARATOR 44 +INPUT HIGH | 1 | 0 1 |
| COMPARATOR 46 +INPUT LOW | 1 | 1 0 |
| RECEIVER 20 OUT | X | 1 0 |

It is noted that while the aforenoted programming at the positive (+) input terminals of comparators 44 and 46 has been illustrated as being accomplished by a computer, i.e., flag bits from the computer, manually operated switches connected to suitable signal sources may be used as well for the programming.

It will now be understood from the foregoing description of the invention with reference to the drawing that a digital signal transmitter/receiver system including a programmable self-test capability has been provided. Significantly, the implementation described can be accomplished by solid state means. Thus, differential comparators 20, 44 and 46 are each one-quarter of a solid state differential comparator as aforenoted so that the system described can be implemented by using a single integrated circuit for cost and space economy purposes as will be recognized as an advantageous feature of the invention.

What is claimed is:

1. A digital signal transmitter/receiver system including self-test capability, comprising:
    means for providing a digital data signal;
    means for providing a digital control signal;
    a digital line driver connected to the control signal means and responsive to the control signal for being rendered in ON and OFF states;
    the digital line driver connected to the data signal means and responsive to the signal therefrom for providing a pair of differential signals, one of the signals switching between logic LOW and logic HIGH states and the other signal switching between logic HIGH and logic LOW states when the driver is rendered ON;
    a pair of signal transmission lines connected to the driver, each of which transmits one of the differential signals when the driver is rendered ON and being in a high impedance state when the driver is rendered OFF to inhibit transmission of the signals;

a resistor and a capacitor serially connected across the signal transmission lines for providing a line impedance matching network;

differential receiver means connected to the signal transmission lines for receiving the signals transmitted thereby and for providing an output signal;

differential comparator means connected to the signal transmission lines; and means for programming input signals to the comparator means whereby the comparator means provides output signals for controlling the logic state of the signals transmitted over the transmission lines to the receiver to control the logic state of the receiver output signal in accordance with a test program.

2. A system as described in claim 1, including:

the comparator means having first and second comparators each of which has positive and negative input terminals and an output terminal;

means for providing a threshold signal;

means for providing test signals at logic HIGH and logic LOW levels;

the negative input terminals of the first and second comparators connected to the means for providing a threshold signal;

the positive input terminals of the first and second comparators connected to the means for providing test signals; and the first and second comparators arranged so that when the level of the signals at the positive input terminals exceeds the level of the signals at the negative input terminals the comparators are ineffective for providing output signals at the output terminals thereof.

3. A system as described in claim 2, wherein:

the differential receiver means has positive and negative input terminals and an output terminal;

the positive input terminal is connected to one of the pair of signal transmission lines and the negative input terminal is connected to the other of the pair of signal transmission lines;

the output terminal of one of the first and second comparators is connected to the one signal transmission line and the output terminal of the other comparator is connected to the other signal transmission line; and the means for providing test signals providing logic HIGH signals at the positive input terminals of the first and second comparators, whereby the comparators relinquish control of the signals transmitted over the transmission lines when the differential driver is rendered ON.

4. A system as described in claim 3, wherein:

the means for providing test signals providing a logic HIGH signal at the positive input terminal of one of the first and second comparators and providing a logic LOW signal at the positive input terminal of the other of the first and second comparators when the differential driver is in the OFF state, whereby the transmitted signals are controlled so that the signals at the positive and negative input terminals of the differential receiver are at a logic LOW state and a logic HIGH state, respectively; and the signal at the output terminal of the differential receiver being thereupon at a logic LOW state when the differential receiver is operational.

5. A system as described by claim 3, wherein:

the means for providing test signals providing a logic LOW signal at the positive input terminal of one of the first and second comparators and providing a logic HIGH signal at the positive input terminal of the other of the first and second comparators when the differential driver is in the OFF state, whereby the transmitted signals are controlled so that the signals at the positive and negative input terminals of the differential receiver are at a logic HIGH state and a logic LOW state, respectively; and the signal at the output terminal of the differential receiver being thereupon at a logic HIGH state when the differential receiver is operational.

6. A system as described by claim 1, including:

biasing signal means connected to each of the pair of signal transmission lines intermediate the line impedance matching network and the differential receiver means.

7. A system as described by claim 1, including:

means connected to the differential receiver means for utilizing the output signal therefrom; and biasing signal means connected intermediate the differential receiver means and the utilizing means.

8. A digital signal transmitter/receiver system including self-test capability, comprising:

means for providing a digital data signal;

means for providing a digital control signal;

a digital line driver connected to the control signal means and responsive to the control signal for being rendered in ON and OFF states;

the digital line driver connected to the data signal means and responsive to the signal therefrom for providing a pair of differential signals, one of the signals switching between logic LOW and logic HIGH states and the other signal switching between logic HIGH and logic LOW states when the driver is rendered ON;

a pair of signal transmission lines connected to the driver, each of which transmits one of the differential signals when the driver is rendered ON and being in a high impedance state when the driver is rendered OFF to inhibit transmission of the signals;

differential receiver means connected to the signal transmission lines for receiving the signals transmitted thereby and for providing an output signal;

differential comparator means connected to the signal transmission lines;

means for programming input signals to the comparator means whereby the comparator means provides output signals for controlling the logic state of the signals transmitted over the transmission lines to the receiver to control the logic state of the receiver output signal in accordance with a test program;

means connected to the differential receiver means for utilizing the output signal therefrom; and biasing signal means connected intermediate the differential receiver means and the utilizing means.

9. A system as described by claim 8, including:

a resistor and a capacitor serially connected across the signal transmission lines for providing a line impedance matching network.

10. A system as described in claim 9, including:

the comparator means having first and second comparators each of which has positive and negative input terminals and an output terminal;

means for providing a threshold signal;

means for providing test signals at logic HIGH and logic LOW levels;

the negative input terminals of the first and second comparators connected to the means for providing a threshold signal;

the positive input terminals of the first and second comparators connected to the means for providing test signals; and the first and second comparators arranged so that when the level of the signals at the positive input terminals exceeds the level of the signals at the negative input terminals the comparators are ineffective for providing output signals at the output terminals thereof.

11. A system as described in claim 10, wherein:

the differential receiver means has positive and negative input terminals and an output terminal;

the positive input terminal is connected to one of the pair of signal transmission lines and the negative input terminal is connected to the other of the pair of signal transmission lines;

the output terminal of one of the first and second comparators is connected to the one signal transmission line and the output terminal of the other comparator is connected to the other signal transmission line; and the means for providing test signals providing logic HIGH signals at the positive input terminals of the first and second comparators, whereby the comparators relinquish control of the signals transmitted over the transmission lines when the differential driver is rendered ON.

12. A system as described in claim 11, wherein:

the means for providing test signals providing a logic HIGH signal at the positive input terminal of one of the first and second comparators and providing a logic LOW signal at the positive input terminal of the other of the first and second comparators when the differential driver is in the OFF state, whereby the transmitted signals are controlled so that the signals at the positive and negative input terminals of the differential receiver are at a logic LOW state and a logic HIGH state, respectively; and the signal at the output terminal of the differential receiver being thereupon at a logic LOW state when the differential receiver is operational.

13. A system as described in claim 11, wherein:

the means for providing test signals providing a logic LOW signal at the positive input terminal of one of the first and second comparators and providing a logic HIGH signal at the positive input terminal of the other of the first and second comparators when the differential driver is in the OFF state, whereby the transmitted signals are controlled so that the signals at the positive and negative input terminals of the differential receiver are at a logic HIGH state and a logic LOW state, respectively; and the signal at the output terminal of the differential receiver being thereupon at a logic HIGH state when the differential receiver is operational.

14. A system as described in claim 9, including:

biasing signal means connected to each of the pair of signal transmission lines intermediate the line impedance matching network and the differential receiver means.

* * * * *